United States Patent
Lambert et al.

(10) Patent No.: US 11,669,504 B2
(45) Date of Patent: *Jun. 6, 2023

(54) DATABASE SCHEMA BRANCHING WORKFLOW, WITH SUPPORT FOR DATA, KEYSPACES AND VSCHEMAS

(71) Applicant: PlanetScale, Inc., Mountain View, CA (US)

(72) Inventors: Sam George Lambert, San Francisco, CA (US); Patrick A. Reynolds, Chapel Hill, NC (US); Shlomo Noach, Mizpe Aviv (IL); Nicholas Diego Van Wiggeren, Seattle, WA (US); Jordan Tyler Williams, San Francisco, CA (US)

(73) Assignee: PlanetScale, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,748

(22) Filed: Nov. 15, 2022

(65) Prior Publication Data

US 2023/0072825 A1    Mar. 9, 2023

Related U.S. Application Data

(63) Continuation of application No. 17/707,884, filed on Mar. 29, 2022, now Pat. No. 11,531,653.

(60) Provisional application No. 63/167,403, filed on Mar. 29, 2021.

(51) Int. Cl.
G06F 16/21    (2019.01)

(52) U.S. Cl.
CPC .......... *G06F 16/213* (2019.01); *G06F 16/219* (2019.01)

(58) Field of Classification Search
CPC .............................. G06F 16/213; G06F 16/219
See application file for complete search history.

(56) References Cited

U.S. PATENT DOCUMENTS

2015/0227533 A1 *    8/2015    Goldstein ............. G06F 40/143
707/661

* cited by examiner

*Primary Examiner* — Mark D Featherstone
*Assistant Examiner* — Kweku William Halm
(74) *Attorney, Agent, or Firm* — Brill Law Office; Jeffrey Brill

(57) ABSTRACT

A branch of a main database is created, comprising a copy of the main database schema. A user edits the branch and requests that it be merged back into the main database. A schema diff is generated and used to determine differences between the main database and the edited branch. The merge is performed if it does not create a conflict. A second branch is created and edited by a second user. When the second user indicates to merge the second branch back into the main database, differences between the two branches are determined, relative to the main database. If merging the second branch back into the main database on top of the first branch does not create a conflict, a three-way merge is performed of the first branch, the second branch, and the version of the main database from which the first and second branches were generated.

24 Claims, 7 Drawing Sheets

Database Schema

"Users" Table
Primary Key | Index Column

| id INT | name VARCHAR |
|---|---|
| 1 | Alice |
| 2 | Bob |
| ... | ... |
| ... | ... |
| ... | ... |
| ... | ... |
| ... | ... |
| ... | ... |

"databases" Table
Primary Key | Foreign Key Corresponds to id in the "Users" Table

| id INT | owner_id INT |
|---|---|
| 20 | 1 |
| 21 | 1 |
| 22 | 1 |
| 23 | 2 |
| 24 | 2 |
| ... | ... |
| ... | ... |
| ... | ... |

FIG. 1   PRIOR ART

DATABASE SCHEMA BRANCHING WORKFLOW, WITH SUPPORT FOR DATA, KEYSPACES AND VSCHEMAS

CROSS-REFERENCE TO RELATED APPLICATION

The present application is a continuation and claims the benefit of U.S. patent application Ser. No. 17/707,884, entitled "Database Schema Branching Workflow, with Support for Data, Keyspaces and VSchemas," filed on Mar. 29, 2022. U.S. patent application Ser. No. 17/707,884 claims the benefit under 35 U.S.C. § 119(e) of U.S. Provisional Patent Application Ser. No. 63/167,403, entitled "Database Schema Branching Workflow," filed on Mar. 29, 2021, and having the same assignee, the entire contents of which are incorporated herein by reference.

TECHNICAL FIELD

This disclosure pertains generally to a database schema branching workflow that enables developers to propose, implement, test, and deploy database schema changes, with the optional inclusion of other database components such as data, keyspaces, and/or VSchemas.

BACKGROUND

A relational database is arranged into tables, with each table organized as a set of columns. Each column has a type and possibly other constraints on the values that can be stored in that column. Most tables have indices, which make some forms of queries, especially retrieving a single row based on an ID or name value in that row, much faster. This structure of the database, which is typically described in a formal language supported by the given database management system in which the database is instantiated, is referred to as the database's schema. The schema can be thought of as a description of how data is modeled in a specific relational database, including but not limited to a description of the tables, columns, integrity constraints, and indices. An example of a conventional schema is illustrated in FIG. 1.

As an application or service is developed, developers often need to make changes to the schema of the underlying database, such as new fields, supporting new sorts of queries, and rearranging the ways various sorts of data relate to each other.

Unfortunately, changing a database's schema is one of the riskiest and most cumbersome tasks in the development lifecycle. A seemingly small change to an index or the constraints on a database column can cause a database server to become overloaded or to reject previously valid updates. Small changes can also take a surprisingly long time to deploy, especially in the case of larger databases. Even a simple change like adding a new column might take hours or days. Adding a new index can take even longer.

In a different context, that of source code version control, a conventional source code version control system can be used to make and merge branches of source code. For example, a developer would make a branch comprising a copy of the code in a specific state, to safely implement and test modifications. When the developer believes the changes are ready, s/he proposes a "pull request" or "merge request" to make the branch part of the main codebase again. As part of this request, the edited code in the branch may be temporarily deployed as part of a staging or production system. If that succeeds, and the developer's colleagues approve the change, the branch may be merged back into the main codebase.

A conventional source code version control system is not able to branch and merge database schemas. To determine the differences between multiple versions of a source code file, the text of the individual lines can be compared, and deletions, additions and changes identified. As explained above, a schema is not a text file of lines of source code, but instead a description of the data modeling architecture of a database, and may include a description of the tables, columns, integrity constraints, and indices. Determining differences between versions of schemas is non-trivial, and is not a function provided by conventional version control systems, which operate at the level of groups of text files. Thus, conventional version control systems are not capable of performing schema diffs, much less merging multiple versions of edited schemas.

Because of the risk and expense of making schema changes, many organizations require that schema changes be implemented by database administrators (DBAs), who are often on a different team from developers. DBAs can become a bottleneck, because they have to review and implement changes from many developers. This introduces delay at all stages of any development that requires a schema change: planning, implementation, testing, and deploying to production. Sometimes, to avoid such DBA-based delays, developers choose other, worse implementations for their data storage, to avoid making a schema change.

It would be desirable to address these issues.

SUMMARY

A database schema branching system is described herein, which enables branching, editing and merging of database schemas, including multiple branches worked on by multiple developers in parallel. A developer who wishes to make any change to a database schema may create a branch of the main database. The result is a copy in a sandbox, which is isolated from the production database. In the sandbox, the developer can make any schema changes without risk to production systems. The developer can use that database branch to implement, test, and iterate on their changes to the schema, until the edited schema is believed to be ready be to be merged back into the main database. Once it is determined that the changes made in the database branch are safe and desired, the branch can be merged back into the main database, for example in response to a control signal generated by the developer operating a web based (or other type of) interface. Multiple active database branches may be maintained at once, and these may be merged back into the main database, or into each other, in any order using, e.g., a three-way merge.

In an example implementation, a first branch of the main database may be created. This branch includes a copy of at least the schema of the main database in a specific state, as recorded in a database version tracking system. As described below, in some implementations, the branch may also include data (e.g., all of the row data, a filtered subset, programmatically created data, etc.). The branch copy is created in a workspace isolated from the database version tracking system, such that it can be worked on without affecting the main (e.g., production) database.

When the user associated with the first branch wishes to merge the edited branch from the sandbox back into the main database, the user can so indicate, for example by selecting an appropriate graphical user interface component.

In response to receiving a corresponding control signal indicating to perform the merge, the database schema branching system determines differences between the current version of the main database and the edited version of the first branch. This may be done by generating at least one schema diff, and identifying changes the user made to the copy of the schema of the main database. It is then determined from at least one schema diff whether merging the changed version of the first branch back into the database version tracking system creates a conflict.

If it is determined that merging the changed version of the first branch back into the database version tracking system does not create a conflict, the merge is performed. The merge may be performed by making schema operations such as create table (for each newly added table), drop table (for each deleted table) and alter table (if any tables have been altered).

As noted above, multiple branches may be edited by different developers in parallel. For example, suppose that while the first branch is being edited as described above, a second branch is created for a second user. Like the first branch, the second branch comprises a copy of the main database. The second branch is separate from the first branch, and is created in its own workspace isolated from the database version tracking system. In this scenario, when the user associated with the second branch indicates to merge a changed version of the second branch back into the database version tracking system, the database schema branching system determines differences between the changed version of the first branch and the changed version of the second branch, relative to a version of the main database as tracked by the database version tracking system from which the first branch and the second branch were generated.

This determination of differences can be made by generating a series of schema diffs of the branches and the main database, and creating a series of temporary schema, to determine if the results of merging the branches in either order is identical. For example, a first schema diff may be generated of the main database (the version thereof as tracked by the database version tracking system from which the first branch and the second branch were generated) and the changed version of the first branch. A first temporary schema based on the first schema diff is then created. A second schema diff is generated of the first temporary schema and the changed version of the second branch, and a second temporary schema is created based on the second schema diff. The second temporary schema is the result of merging the first branch into the main database (resulting in the first temporary schema) and then merging the second branch on top of that result.

The result of performing the merge in the other order (second branch into main, then first branch on top of that) is determined by generating a third schema diff of the main database and the changed version of the second branch. A third temporary schema is created based on the third schema diff. The third temporary schema is the result of merging the second branch into the main database. A fourth schema diff is then generated of the third temporary schema and the changed version of the first branch. A fourth temporary schema is created based on the fourth schema diff. The fourth temporary schema is the result of merging the second branch into the main database (resulting in the third temporary schema) and then merging the first branch on top of that result. Thus, the system now has the results of merging the two branches into the main database in both possible orders. It can be determined if the merge creates a conflict by determining whether the second and fourth temporary schema are identical. If they are, then the branches can be merged in either order without creating a conflict. On the other hand, if the second and fourth temporary schemas are not identical, it is determined that the merge does create a conflict.

Responsive to determining that merging the changed version of the second branch back into the database version tracking system on top of the changed version of the first branch does not create a conflict, the merge is performed, for example by performing a three-way merge of the changed version of the first branch, the changed version of the second branch, and the version of the main database from which the first branch and the second branch were generated. On the other hand, if it is determined that a conflict is created, the merge is not performed. In this scenario, the database schema branching system may output (e.g., via a graphical user interface) information concerning the conflict to the associated user, for example suggestions concerning at least one schema change to resolve the conflict.

In order to support the processing of multiple branches being edited by different developers in parallel, the database schema branching system may maintain a queue of pending changes that are in the process of being merged back into the main database as tracked by the database version tracking system. The queue may be used to combine, reorder and/or cancel pending changes as desired.

It is also possible for the database schema branching system to utilize a reconciliation process to perform actions such as creating a database branch, destroying a database branch, taking a snapshot of at least one schema and/or applying at least one schema to an existing database. A reconciliation process can take the form of determining a desired end-state, calculating steps to reach the end-state from a current state, and executing the calculated steps. If a failure occurs after executing only a subset of the calculated steps, an updated set of steps to achieve the desired end-state from the updated current state may be determined and executed. Because some of the originally calculated steps have been performed, the updated set of steps is potentially shorter.

As noted above, in some implementations a branch includes not only the schema of the main database but data as well. In some instances, this can take the form of copying data from the main database into the copy of the main database in the branch. This can be a subset of the data stored in the main database, for example a filtered subset created by filtering the data of the main database at any desired level of granularity. Filters can be based on criteria such data sensitivity, data content, storage location and sharding architecture. In some instances, all of the data stored in the main database may be copied to the branch. In other implementations, rather than copying data from the main database, the branch is populated with programmatically created data or with a stored data set. In implementations in which branches include data, merging the branch may include restoring changed branch data back into the main database, where desired.

In some implementations, creating a branch further comprises creating a copy of at least one object-relational mapping system migration control table of the main database. In such instances, merging a branch can further comprise merging at least one change to the copy of the at least one object-relational mapping system migration control table into the at least one object-relational mapping system migration control table of the main database.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 illustrates an example of a conventional database schema.

Figure 2:
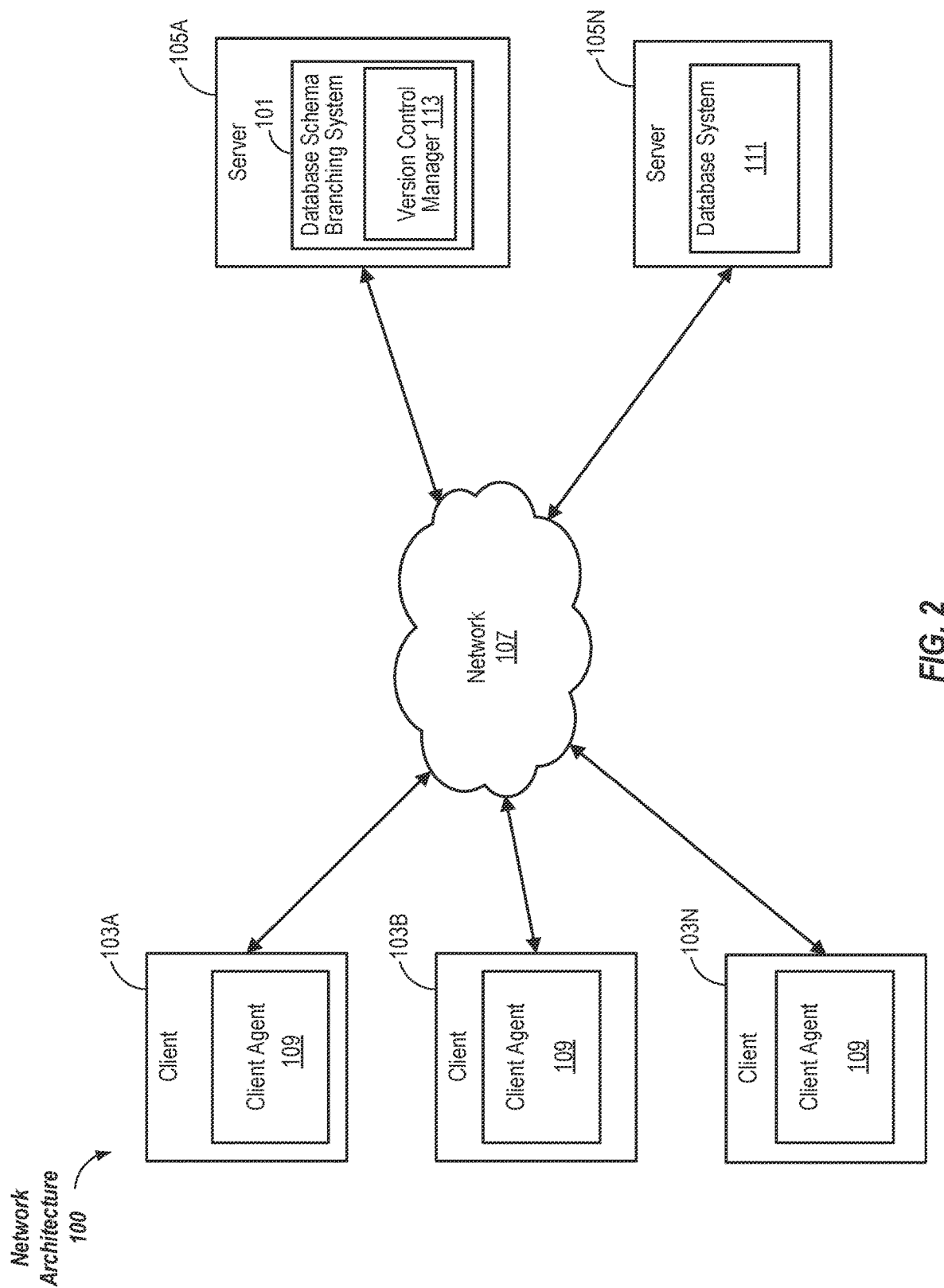
FIG. 2 illustrates a network environment in which a database schema branching system can operate, according to some implementations.

The Figures depict various implementations for purposes of illustration only. One skilled in the art will readily recognize from the following discussion that other implementations of the structures and methods illustrated herein may be employed without departing from the principles described herein.

DETAILED DESCRIPTION

A database schema branching system 101 is described herein, which enables branching, editing and merging of database schemas. As described in detail below, the database schema branching system 101 enables branching workflows for database schemas, including multiple branches worked on by multiple developers in parallel. A developer who wishes to make any change to a database schema may create a branch of the main database. The result is a copy in a sandbox, which is isolated from the production database. In the sandbox, the developer can make any schema changes, quickly and without risk to customer-facing systems. The developer can use that database branch to implement, test, and iterate on their changes to the schema, until the edited schema is believed to be ready be to be merged back into the main database.

In some implementations, using a website-based (or other) interface provided by the database schema branching system 101, the developer can request a review of the edited schema from his or her colleagues. The changes can be reviewed at a team level, and team members can view and discuss the differences between the branch of the database and the original, production database. It is also possible to send some fraction of staging or production traffic to the branch database to see how it performs, prior to merging it back into production.

Once it is determined that the changes made in the database branch are safe and desired, the database schema branching system 101 can merge the branch back into the main database, for example in response to a control signal generated by the developer operating a web based (or other type of) interface. The database schema branching system 101 may maintain many active database branches at once, and to merge them back into the main database, or into each other, in any order using, e.g., a three-way merge. As described in detail below, in other implementations branch copies of the main database may also include other database components such as data (e.g., all of the row data, a filtered subset, programmatically created data), keyspaces and/or VSchemas, in addition to schemas. As explained in more detail below, a keyspace is a logical database, consisting of tables, columns, and indices. Depending upon the implementation, a keyspace can map to a single database or more than one underlying database (for example, if sharding is being used). A keyspace appears as a single database from the standpoint of the database application. Also discussed in more detail below, a VSchema, short for Vitess schema, is a description of how to divide one logical database across many servers, also referred to as shards. The VSchema is a mapping of data values to locations.

FIG. 2 is a high-level block diagram illustrating an exemplary network architecture 100 in which a database schema branching system 101 can be implemented. The illustrated network architecture 100 comprises multiple clients 103A, 103B, and 103N (together may be referred to as "client 103") as well as multiple servers 105A and 105N (together may be referred to as "server 105"). In FIG. 2, the database schema branching system 101 is illustrated as residing on the server 105A, a database system 111 is illustrated as residing on the server 105N, and a client agent 109 is illustrated as running on each client 103A-N. It is to be understood that this is an example only. In various implementations, various functionalities of database schema branching system 101 can be instantiated on a server 105, a client 103, or can be distributed among multiple servers 105 and/or clients 103. Additionally, although the database system 111 is illustrated as residing on a single server 105B, it is to be understood that the database system 111 can be distributed across multiple computing devices.

In FIG. 2 a database version tracking system 113 is illustrated as being a part of the database schema branching system 101. As described in detail below, the database schema branching system 101 utilizes various functionalities to track, maintain and merge versions of databases. As used herein, the term "database version tracking system" simply means an instantiation of functionalities used to manage the versioning of databases as described herein. It is to be understood that a conventional source code version control system is not needed to perform these functionalities, and in fact would not be capable of providing all such operations, as explained above. In some implementations, the database version tracking system 113 may use a version control system to provide some of its functionality in the course of its operations, but this is by no means a requirement of the database schema branching system 101. It is to be understood that in some implementations the database version tracking system 113 may be instantiated separately from rather than as a part of the database schema branching system 101, or the functionalities of these systems may be distributed in other ways between different applications and systems as desired.

The clients 103 can be in the form of computing devices operated by developers, such as, for example, desktop or laptop computers configured as development environments. A client agent 109 may be in the form of an application containing endpoint-level functionality for utilizing and/or interacting with the database schema branching system 101. In some implementations, client agents 109 are not utilized.

Clients 103 and servers 105 can be implemented using computer systems 210 such as the one illustrated in FIG. 6 and described below. The clients 103 and servers 105 are communicatively coupled to a network 107, for example via a network interface 248 as described below in conjunction with FIG. 6. Clients 103 are able to access applications and/or data on servers 105 using, for example, a web browser or other client software such as a client agent 109. Clients may be in the form of laptops, desktops and/or other types of computers/computing devices, including mobile computing devices, comprising portable computer systems capable of connecting to a network 107 and running applications (e.g., smartphones, tablet computers, wearable computing devices, etc.). Servers 105 can be in the form of, e.g., rack-mounted computing devices, located, e.g., in data centers.

Although FIG. 2 illustrates three clients 103 and two servers 105 as an example, in practice many more (or fewer) clients 103 and/or servers 105 can be deployed. In one implementation, the network 107 is in the form of the Internet. Other and/or additional networks 107 or network-based environments can be used in other implementations.

FIG. 2 illustrates a database schema branching system 101 and database version tracking system 113 running in the system memory 217 of a server 105A, and client agents 109 running in the system memory of clients 103A-N. As described above, the functionalities of the database schema branching system 101, of the database version tracking system 113 and of the client agents 109 can reside on a server 105, a client 103, or can be distributed among multiple computer systems 210, including within a cloud-based computing environment in which the functionalities of the database schema branching system 101 are provided as a service over a network 107. It is to be understood that although the database schema branching system 101, database version tracking system 113 and client agents 109 are illustrated in the Figures as discrete entities, the illustrated database schema branching system 101, database version tracking system 113 and client agents 109 represent collections of functionalities, which can be instantiated as a single or multiple modules on one or more computing devices 210 as desired.

It is to be understood that the functionalities of the database schema branching system 101, database version tracking system 113 and client agents 109 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the database schema branching system 101 and client agent 109 can be stored on computer-readable storage media. Any form of tangible computer readable storage medium can be used in this context, such as magnetic or optical storage media. As used herein, the term "computer-readable storage medium" does not mean an electrical signal separate from an underlying physical medium.

Figure 3:
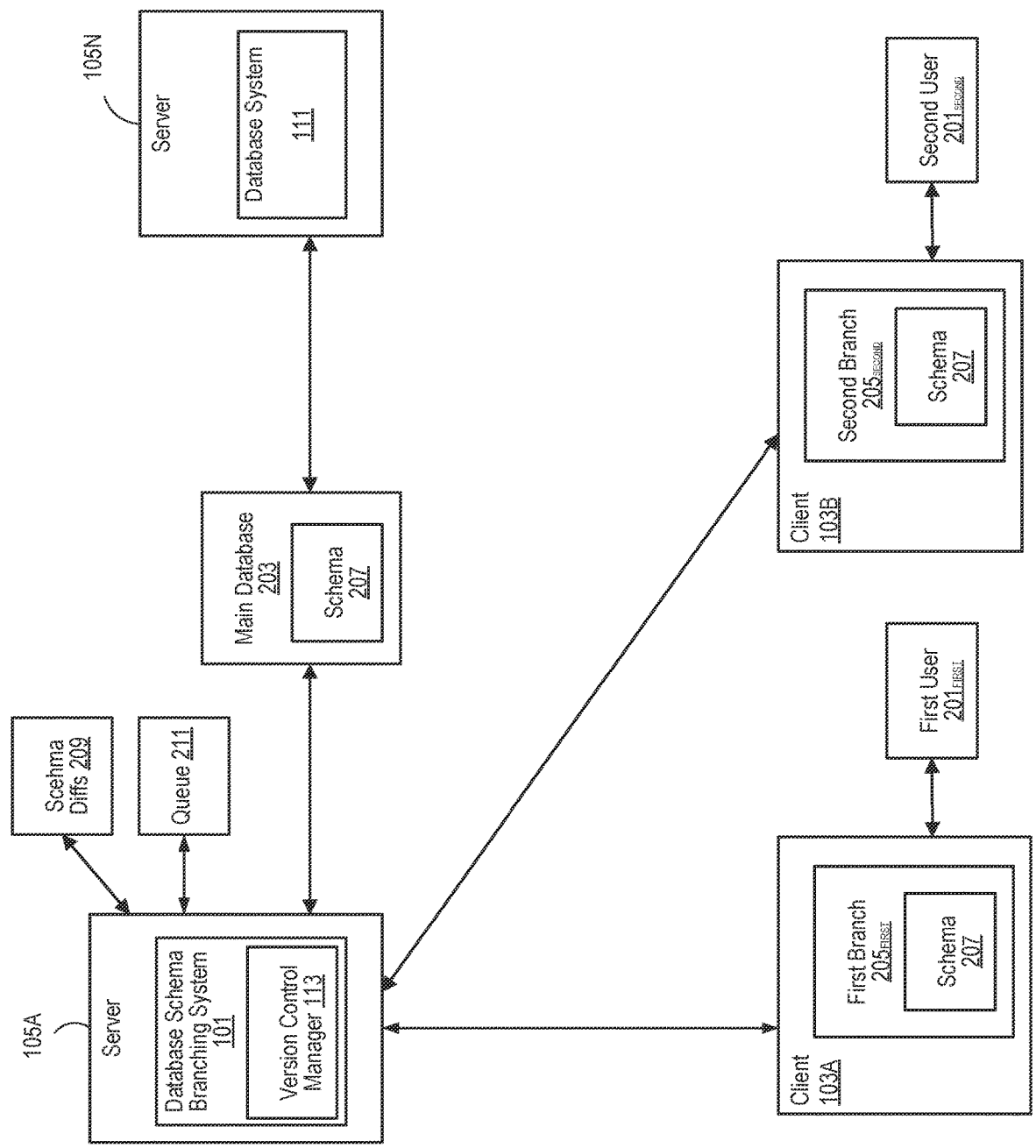
FIG. 3 illustrates the operation of a database schema branching system, according to some implementations.

FIG. 3 illustrates the operation of the database schema branching system 101 according to some implementations. A user 201 (e.g., a developer) operating a client computer 103A interacts with the database schema branching system 101, for example by using a graphical user interface provided by the database schema branching system 101. This interface can be, for example, a web-based interface accessed via a browser, or an interface provided on a client agent 109. In the example implementation illustrated in FIG. 3, the database schema branching system 101 creates a branch 205 of a main database 203 from the database version tracking system 113. The main database 203 can be any database in a specific state as tracked by the database version tracking system 113, such as a production version of a database developed, maintained and commercially provided by an organization for which the developer works.

It is to be understood that the version of the main database 203 from which a branch 205 is made need not be a production version. For example, in different embodiments branches 205 can be made from any specific version of the main database 203 as recorded in the database version tracking system 113, such as a version being tested that has not yet been released into production, etc. The branch 205 includes at least a copy of the schema 207 of the main database 203 in the specific state as recorded in the database version tracking system 113. As described in more detail below, in some implementations the branch 205 also includes data and/or other additional database related components and/or information. The copy is created in a workspace isolated from the database version tracking system 113, such as one or more temporary virtual servers attached to a network, or a specific folder or set of folders on a computing device operated by the user 201, etc. This workspace functions as a sandbox, because any changes the user 201 makes to the branch 205 in the workspace will not affect the main database 203.

Once the branch 205 is copied to the workspace, the user 201 may make and test changes to the schema 207 as desired, without affecting the main database 203. It is to be understood that the user 201 has complete control over the branch 205. The user 201 can make schema 207 changes at will. Because the branch 205 is in a sandbox, nothing 201 the user 201 does on the branch 205 has any effect on the main database 203.

Changes to the schema 207 can include creating tables, dropping tables and altering tables. Creating tables is least complex, dropping tables is more complex, and altering existing tables is the most complex. The nature of an alter-table change is that it is both blocking and resource intensive. Running alter table in production is risky, with high potential to cause an outage. Such risks and outages are avoided by making the alter table changes in the branch 205, and testing them prior to merging them back into the main database 203.

The developer can use the database branch 205 to implement, test, and iterate on their changes to the schema 207, until the edited schema 207 is believed to be ready be to be merged back into the main database 203. As noted above, this testing and adjudication of readiness can include a review of the edited schema 207 from the user's colleagues. The changes can be reviewed at a team level, and team members can view and communicate concerning the differences between the edited branch 205 and the original, main database 203. It is also possible to send some fraction of staging or production traffic to the database branch 205 to see how it performs, prior to merging it back into the main database 203.

Once the user 201 indicates to merge the changed version of the branch 205 back into the database version tracking system 113, the database schema branching system 101 can automatically determine the differences between the current version of the main database 203 as tracked by the database version tracking system 113, and the changed version of the branch 205. In an implementation in which the changes are edits to the schema 207, the database schema branching system 101 can identify changes the user 201 made to the copy of the schema 207 of the main database 203 in the process of editing the branch 205. To do so, the database schema branching system 101 can generate a summary of the changes, called a schema diff 209, of the schema 207 of the main database 203 and the changed schema 207 of the branch 205.

As noted above, a schema 207 is not an ordinary text file in which differences between lines of text constitute a satisfactory diff for purposes of version control or merging. Instead, a schema 207 is a description of the architecture of the data modeling in a database, and may include a description of the tables, columns, integrity constraints, indices and the like. Determining differences between versions of schemas 207 is non-trivial. When comparing two schemas 207, the database schema branching system 101 identifies differences between them as expressed by a database description/data definition language (e.g., SQL, JSON, XML, etc.). A schema diff 209 is different from a (line-by-line) diff that is used in source code version control systems. A schema diff includes CREATE TABLE statements for each new table created, DROP TABLE statements for each table dropped, and ALTER TABLE statements for each existing table modified (e.g., by adding a column or index). To apply the diff to a schema 207 means to change that schema 207.

As described in more detail below in the description of three-way merges, the database schema branching system 101 can determine, from one or more schema diff(s) 209, whether merging the changed version of the branch 205 back into the main database 203 as recorded in the database version tracking system 113 creates a conflict. If the database schema branching system 101 determines that merging the changed version of the branch 205 back into the main database 203 does not create a conflict, the database schema branching system 101 does the merging (e.g., applies the schema diff 209 to the schema 207 of the main database 203 and checks the result into the database version tracking system 113). As described in more detail below, merging the changed version of the first branch $205_{FIRST}$ back into the database version tracking system 113 may further comprises performing one or more schema 207 operations such as create table, drop table and alter table, based on the changes made in the branch 205, as indicated by the schema diff 209.

It is to be understood that the database schema branching system 101 can create multiple branches 205 of the main database 203, which can be edited in parallel by different developers, and subsequently merged on top of each other. For example, suppose that a first user $201_{FIRST}$ edits a first branch $205_{FIRST}$ as described above, while in parallel the database schema branching system 101 creates a second branch $205_{SECOND}$ of the main database 203 from the database version tracking system 113, to be edited by a second user $201_{SECOND}$. The second branch $205_{SECOND}$ comprises a copy of the main database 203 that is separate from the first branch $205_{FIRST}$, but like the first branch $205_{FIRST}$ also includes at least a copy of the schema 207 of the main database 203 in a specific state recorded in the database version tracking system 113. The second branch $205_{SECOND}$ is created in a workspace associated with the second user $201_{SECOND}$, isolated from the database version tracking system 113.

As described above concerning the first user $201_{FIRST}$, when the second user $201_{SECOND}$ is ready to merge the edited second branch $205_{SECOND}$ back into the main database 203, the second user $201_{SECOND}$ so indicates, for example by selecting a corresponding user interface component on a GUI presented by the database schema branching system 101. In response to receiving the corresponding control signal indicating to merge the changed version of the second branch $205_{SECOND}$, the database schema branching system 101 can determine the differences between the changed version of the first branch $205_{FIRST}$ and the changed version of the second branch $205_{SECOND}$, relative to the version of the main database 203 from which the first branch $205_{FIRST}$ and the second branch $205_{SECOND}$ were generated, as recorded by the database version tracking system 113.

To do so, the database schema branching system 101 creates and utilizes a series of schema diffs 209, in order to perform a three-way merge. More specifically, referring to the schema 207 of the version of the main database 203 from which the branches 205 were created as A, the schema 207 of the first branch $205_{FIRST}$ as B, and the schema 207 of the second branch $205_{SECOND}$ as C, the database schema branching system 101 can create the following schema diffs: A→B and A→C (the diffs between the schema 207 of the main database 203 and the schema 207 of each one of the respective branches 205). The database schema branching system 101 can create temporary schemas and apply the diffs, for example deploying schema A, applying the A→B diff, and then attempting to apply A→C diff on top of the result. The database schema branching system 101 can then attempt to apply the schema diffs 209 in the other order, deploying schema A, applying the A→C diff, and then attempting to apply the A→B diff on top of that result. This way the database schema branching system 101 can detect any conflicts between B and C (the edited schemas 207 from the first branch $205_{FIRST}$ and the second branch $205_{SECOND}$). If both the of above routes are successful and produce identical results, then B and C do not conflict, and a three-way merge is performed. One the other hand, if the results are not the same, then B and C conflict.

Put another way, the database schema branching system 101 generates a first schema diff of the version of the main database 203 as tracked by the database version tracking system 113 from which the first branch $205_{FIRST}$ and the second branch $205_{SECOND}$ were generated and the changed version of the first branch $205_{FIRST}$, and a first temporary schema based on the first schema diff (i.e., by applying the first schema diff to the schema 207 of the main database 203). The database schema branching system 101 generates a second schema diff of the first temporary schema and the changed version of the second branch $205_{SECOND}$, and creates a second temporary schema based on the second schema diff (i.e., by applying the second schema diff to the second temporary schema). The second temporary schema is the result of the applying the edited schema 207 of the first branch $205_{FIRST}$ to the schema 207 of the main database 203, and then applying the edited schema 207 of the second branch $205_{SECOND}$ to that result (e.g., A→B→C).

The database schema branching system 101 can then generate a third schema diff of the schema 207 of the main database 203 and the edited schema 207 of the second branch $205_{SECOND}$, and create a third temporary schema based on the third schema diff (i.e., applying the third schema diff to the schema 207 of the main database 203). At this point the database schema branching system 101 can generate a fourth schema diff of the third temporary schema and the changed version of the schema 207 of the first branch $205_{FIRST}$, and creates a fourth temporary schema based on the fourth schema diff (i.e., by applying the fourth schema diff to the fourth temporary schema). The fourth temporary schema is the result of the applying the edited schema 207 of the second branch $205_{SECOND}$ to the schema 207 of the main database 203, and then applying the edited schema 207 of the first branch $205_{FIRST}$ to that result (e.g., A→C→B).

Figure 4:
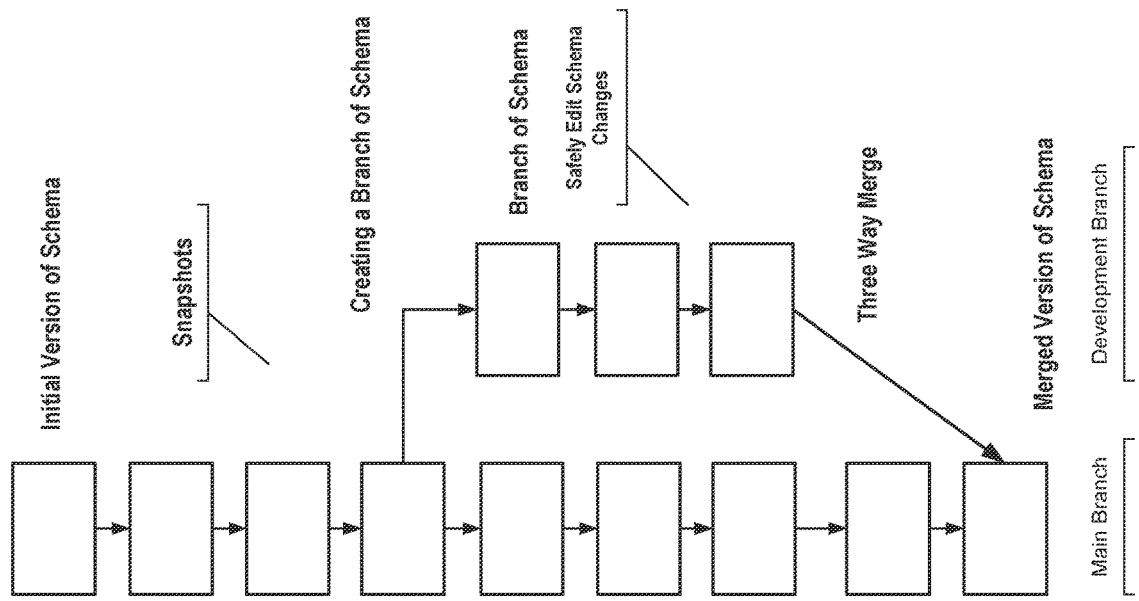
FIG. 4 illustrates an example version control workflow including a three-way merge, according to some implementations.
Figure 5A:
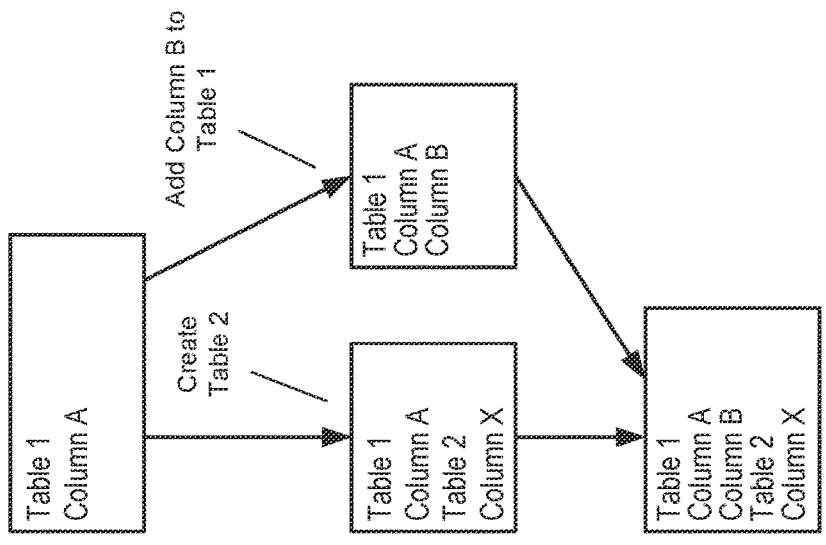
FIG. 5A illustrates successful three-way schema merge, according to some implementations.

If the second temporary schema (A→B→C) and the fourth temporary schema (A→C→B) are identical, then the edited schema 207 of the first and second branch do not conflict, and the resulting combined schema 207 (e.g., A→B→C which is the same as A→C→B) is added to database version tracking system 113 as the result of the three-way merge of the changed schema 207 of the first branch $205_{FIRST}$, the changed schema 207 of the second branch $205_{SECOND}$, and schema 207 of the version of the main database 203 as tracked by the database version tracking system 113 from which the first branch $205_{FIRST}$ and the second branch $205_{SECOND}$ were generated. This can be thought of as merging the changed version of the second branch $205_{SECOND}$ back into the database version tracking system 113 on top of the changed version of the first branch $205_{FIRST}$, which in fact is the same as merging the changed version of the first branch $205_{FIRST}$ back into the database version tracking system 113 on top of the changed version of the second branch $205_{SECOND}$, as demonstrated by the second temporary schema and the fourth temporary schema being identical as described above. An example schema version control workflow including a three-way merge is illustrated in FIG. 4. FIG. 5A illustrates a successful three-way schema merge.

As noted above, schema diffs 209 are used to facilitate merge operations. Performing an alter table operation as part of a merge utilizes some special processing which is now described. To perform an alter table operation as part of a merge, the database schema branching system 101 can create a new table with the format according to the alter table operation, where the new table is based on the original table. The database schema branching system 101 can fill the new table with an adapted copy of data from the original table, and then replace the original table with the new table. To do so, the branching system 101 use a technique known as "online schema change," or "online DDL (Data Definition Language)." There are multiple implementations of these technique, but they all share similar base properties: create a new, "shadow" table with the new format, slowly fill it with an adapted copy of the data from the old table, then replace the old, original table with the new, revised table. In some implementations, the database schema branching system 101 uses online DDL when applying ALTER changes on merged branches. Online DDLs are trackable, and the database schema branching system 101 can determine if any specific change is queued, if a change is being applied, or if an earlier change is complete or failed. If a change is being applied ("running"), then its progress and estimated time of completion can be determined.

Concerning queued changes, because multiple developers can work on separate database branches in parallel, the database schema branching system 101 can maintain a queue 211 of changes that are in the process of being merged (accepted) back into the main database 203. Within this queue 111, the database schema branching system 101 can combine, reorder, and cancel pending changes.

In some implementations, in order to make a schema 207 more robust in the face of interruptions and failures, the database schema branching system 101 uses a technique called reconciliation. The input to a reconciliation process is the desired end-state, rather than a set of executable steps to achieve that end-state. As part of the reconciliation process, the database schema branching system 101 calculates the steps to achieve the desired end-state from the current state, and begins to execute them. If the reconciliation process is interrupted or failed, a later call to the same process generates a new, generally shorter, set of steps to achieve the desired result. The database schema branching system 101 can use the reconciliation processes to create and destroy database branches, to take snapshots of database schemas 207, and to apply schemas 207 to existing databases.

Figure 5B:
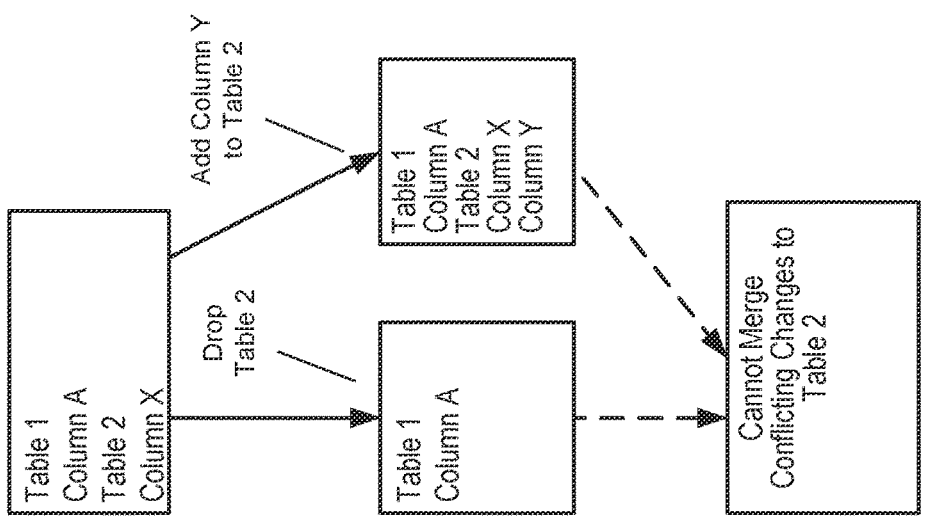
FIG. 5B illustrates an attempted three-way schema merge that results in a conflict, according to some implementations

Referring now to the case in which a conflict occurs (e.g., one of the diffs cannot be applied or A→B→C is not identical to A→C→B), the three-way merge is not performed. In this scenario, the database schema branching system 101 can display information concerning the conflict to one or more users 201 (e.g., a developer making the schema 207 changes). In some implementations, this may include information concerning one or more possible schema 207 changes to resolve the conflict. Such information may be output via a web or client agent interface or the like. FIG. 5B illustrates an attempted schema 207 merge that results in a conflict.

The database schema branching system 101 typically copies only the schema 207 of the main database 203 into a database branch 205. It typically does not copy actual row data, only the schema 207 that describes the rows. However, in some implementations, database branches include not only a copy of the schema 207 of the main database 203, but also data copied from the main database 203 (or predetermined data structurally similar to the data of the main database 203). Depending upon the implementation, this can be in the form of, for example, all of the data, a privacy-scrubbed copy of the data, a subset of the data filtered according to other criteria, a single (or multiple) shard(s) of the data, programmatically generated data, a stored dataset, or no data at all.

Copying data from the main database 203 into a branch 205 can take the form of copying a subset of the data stored in the main database 203, for example by filtering the data in the main database 203 according to any desired criteria, at any desired level of granularity. Example criteria include things such as data sensitivity (e.g., filter out personally identifiable information), or data content (e.g., filter based on address, last name, or any field or combination of fields). In other words, a filter can be used to identify a coherent subset of the data at any level of granularity, (e.g., a set of customers and all the data associated with those customers) and copy that. As discussed in more detail below, the filtering can also be performed based on storage location or sharding architecture, etc.

In some implementations, the database schema branching system 101 creates a copy of the schema 207 of the main database 203, and then populates it with programmatically created data, or with a predetermined data set. Filing the branch 205 with a set of predetermined data may be in the form of using a static set stored, e.g., in a backup, or the data may be a set generated on the fly by code the user 201 (e.g., developer) provides. A static set is faster, but a generated set of data is more amenable to many development processes, because the data-generation code can be checked into the database version tracking system 113. Note also that the static set is static at a given point in time, but may be altered over time, e.g., by the development team. In any case, the predetermined data is shaped like, that is to say is structurally similar to, the actual production data, so that the copied schema 207 may be used to store the predetermined data.

In other implementations, all the data from the main database 203 is copied to the branch 205. Copying all the data from the main database 203 into a branch 205 can be done by restoring from a recent backup, which takes a long time depending on the amount of data in the main database 203. The copying can be done more quickly using copy-on-write (CoW) techniques, either on the underlying filesystem (for example, Amazon RDS supports this) or by using the VReplication features built into Vitess.

In some implementations, in order to copy row data from the main database 203 into a branch 205, the database schema branching system 101 copies migration-control tables used by object-relational mapping (ORM) systems. In such a scenario, to merge the changed branch 205 back into the main database 203, any changes made to the copy of the object-relational mapping system migration control table(s) are merged into the object-relational mapping system migration control table(s) of the main database 203. More specifically, ORM systems often use a table to track which schema 207 changes have been applied. For example, the ORM Ruby on Rails uses a table called schema_migrations. To keep Ruby on Rails and the database schema branching system 101 in sync, the system can make sure that any writes to the schema_migrations table in a database branch 205 are adapted and copied into the schema_migrations table in the main database 203. Similar support is provided for equivalent tables in other ORM systems such as Prisma and Django.

One mechanism for tracking migration-control tables is as follows. By examining a database's schema 207, the database schema branching system 101 can identify which ORM is run on it, based solely on the data definition language (DDL) that has been run in the past. For example, a database with a schema_migrations table is very likely to be managed by Ruby on Rails. Other ORM systems have their own identifying characteristics. Once the database schema branching system 101 has identified the ORM associated with a database, it calls an API to store a copy of the rows from that table. This API exposed by the database schema branching system 101 is framework-agnostic, and takes the names of the relevant tables and columns as parameters. When a branch 205 is created or merged, the database schema branching system 101 can restore that migration-control tables associated data along with the merged schema 207.

In some implementations in addition to schema 207 and data as described above, other categories of changes to database branches are supported. More broadly, a branch 205 can be a safe place to edit and test any sort of database change before merging it back into the main database 203 (e.g., production) Changes made in a branch 205 may be reviewed, enqueued, and applied to the main database 203 safely.

In one implementation, keyspace changes are supported. As noted above, a keyspace is a logical database, consisting of tables, columns, and indices. Depending upon the implementation, a keyspace can map to a single database or more than one underlying database (for example, if sharding is being used). In any case, a keyspace appears as a single database from the standpoint of the database application. In Vitess, for example, a Vitess cluster can host multiple keyspaces. Adding or removing a keyspace is similar to adding or removing a group of related tables, i.e., a schema 207 change. For this reason, in some implementations the database schema branching system 101 treats keyspace changes similarly. As with tables in schemas 207, add keyspace, alter keyspace and delete keyspace are all possible operations. The database schema branching system 101 can copy one or more keyspaces to a development branch 205, where the user 201 can add, edit or remove one or more keyspace(s), and safely merge those changes back into production in the manner described above concerning schema 207 changes. In other implementations, branching workflows for other formats of logical databases are supported.

In other implementations, changes to vSchemas are supported. A database too large for the storage or processing capacity of a single server can be divided among many servers. The portion of the database on each server is called a "shard," and the act of dividing a database into shards is called "sharding." In one implementation, users 201 manually determine a sharding plan, or "VSchema," to determine which rows of the database are stored in which shard. In other implementations, VSchemas are derived for a database automatically based on the columns in the tables, the sizes of the tables, the pattern of query traffic to the database, and potentially other factors.

As discussed above, a VSchema, short for Vitess schema, is a description of how to divide one logical database across many servers, also referred to as shards. The VSchema is a mapping of data values to locations. That mapping is used to ensure that newly inserted data is placed on the right shard, and it routes lookup queries to the correct shard or shards to ensure that all matching results are found. A well-conceived VSchema distributes data and query traffic as evenly as possible across several shards.

Changing VSchemas is complicated and risky, and therefore doing so in production is problematic. An unsafe change can cause performance problems, break query traffic, or even result in existing data becoming inconsistent or unreachable. By copying VSchemas from production to development branches, the developer is able to review, edit and merge VSchema workflows safely, by allowing the user 201 to validate and review changes before applying them to production. In other implementations, branching workflows for other formats of sharding architecture descriptions are supported.

It is to be understood that the three-way merging of database schemas using schema diffs as described herein transforms the original schema 207 of the main database 203 into an updated schema 207 that includes the schema edits made to the multiple branches 205. This ability to edit and test database schemas 207 as branches isolated from the main database 203, and then safely merge the edited branch schemas 207 into the schema 207 of the main database 203 is a great improvement to the field of database development and management.

Figure 6:
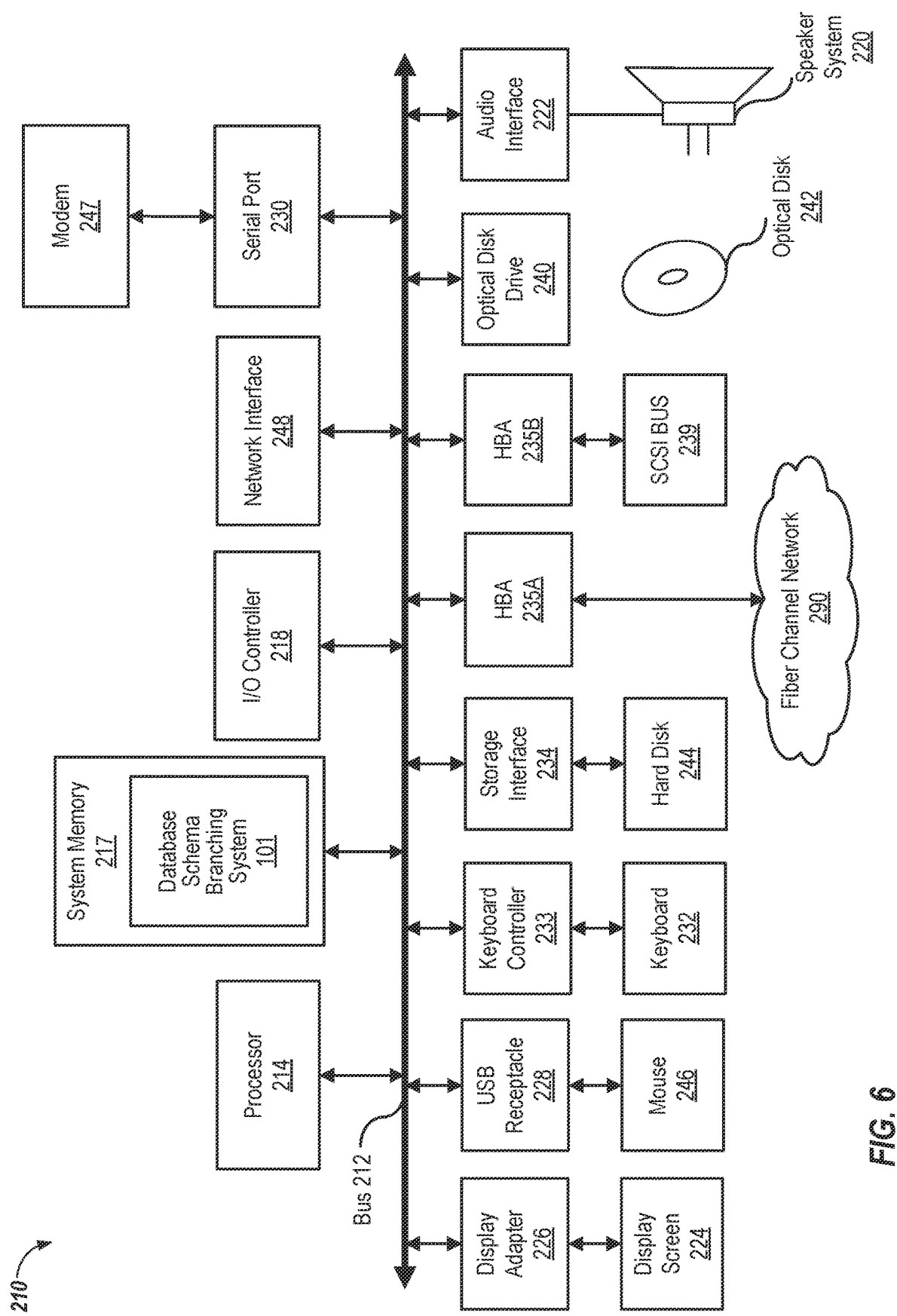
FIG. 6 illustrates a computer system suitable for implementing a database schema branching system, according to some implementations.

FIG. 6 is a block diagram of a computer system 210 suitable for implementing a database schema branching system 101. Both servers 105 and clients 103 can be implemented in the form of such computer systems 210. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media such as solid state drives (SSDs)), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or another pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all the components illustrated in FIG. 6 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 6.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computing device 210), for example via the network interface 248 or modem 247. In FIG. 6, the database schema branching system 101 is illustrated as residing in system memory 217. The workings of the database schema branching system 101 are explained in greater detail above.

The storage interface 234 is coupled to one or more hard disks 244 (and/or other standard storage media such as SSDs). The hard disk(s) 244 may be a part of computing device 210, or may be physically separate and accessed through other interface systems.

The network interface 248 and or modem 247 can be directly or indirectly communicatively coupled to a network 107 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the functions indicated by blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method for maintaining version control for databases in a database version tracking system, with branching support for database schemas, the method comprising:
creating a first branch of a main database from the database version tracking system;
wherein the first branch further comprises a copy of the main database in a specific state, as recorded in the database version tracking system, the copy being created in a workspace isolated from the database version tracking system, the copy comprising at least a copy of a schema of the main database in a specific state;
responsive to receiving a control signal from a user associated with the first branch indicating to merge a changed version of the first branch back into the database version tracking system, determining differences between a current version of the main database as tracked by the database version tracking system and the changed version of the first branch;

wherein determining differences between the current version of the database and the changed version of the first branch further comprises generating at least one schema diff;

determining, from the at least one schema diff, whether merging the changed version of the first branch back into the database version tracking system creates a conflict;

responsive to determining that merging the changed version of the first branch back into the database version tracking system does not create a conflict, merging the changed version of the first branch back into the database version tracking system;

wherein merging the changed version of the first branch back into the database version tracking system further comprises performing at least one schema operation from a group of schema operations consisting of: create table, drop table and alter table, the at least one schema operation being indicated by the at least one schema diff;

creating a second branch of the main database from the database version tracking system;

wherein the second branch further comprises a copy of the main database separate from the copy comprising the first branch, the separate copy being created in a workspace isolated from the database version tracking system, the copy comprising at least a copy of the schema of the main database in the specific state;

responsive to receiving a control signal from a user associated with the second branch indicating to merge a changed version of the second branch back into the database version tracking system, determining differences between the changed version of the first branch and the changed version of the second branch, relative to a version of the main database as tracked by the database version tracking system from which the first branch and the second branch were generated;

wherein determining differences further comprises generating at least one schema diff;

determining, from the at least one schema diff, whether merging the changed version of the second branch back into the database version tracking system on top of the changed first version of the first branch creates a conflict; and responsive to results of the determining, performing a step from a group of steps consisting of:
  responsive to determining that merging the changed version of the second branch back into the database version tracking system on top of the changed version of the first branch does not create a conflict, merging the changed version of the second branch back into the database version tracking system on top of the changed version of the first branch, the merging further comprising performing at least one schema operation from a group of schema operations consisting of: create table, drop table and alter table; and
  responsive to determining that merging the changed version of the second branch back into the database version tracking system on top of the changed version of the first branch does create a conflict, not merging the changed version of the second branch back into the database version tracking system on top of the changed version of the first branch.

2. The method of claim 1 further comprising:
responsive to determining that merging the changed version of the second branch back into the database version tracking system on top of the changed version of the first branch does create a conflict, outputting information concerning the conflict to the user associated with the second branch.

3. The method of claim 1 further comprising:
responsive to determining that merging the changed version of the second branch back into the database version tracking system on top of the changed version of the first branch does create a conflict, outputting suggestions concerning at least one schema change to resolve the conflict, to the user associated with the second branch.

4. The method of claim 1 wherein merging the changed version of the second branch back into the database version tracking system on top of the changed version of the first branch further comprises:
performing a three-way merge of the changed version of the first branch, the changed version of the second branch, and the version of the main database as tracked by the database version tracking system from which the first branch and the second branch were generated, utilizing the at least one schema diff.

5. The method of claim 1 further comprising:
maintaining a queue of pending changes that are in the process of being merged back into the main database as tracked by the database version tracking system.

6. The method of claim 5 further comprising:
combining, reordering and/or canceling at least one of the pending changes.

7. The method of claim 1 further comprising:
utilizing a reconciliation process to perform at least one step from a group of steps consisting of:
  creating a database branch;
  destroying a database branch;
  taking a snapshot of at least one schema; and
  applying at least one schema to an existing database.

8. The method of claim 7 wherein utilizing a reconciliation process further comprises:
determining a desired end-state;
calculating steps to reach the end-state from a current state; and
executing the calculated steps.

9. The method of claim 7 wherein utilizing a reconciliation process further comprises:
determining a desired end-state;
calculating steps to reach the end-state from a current state;
executing a subset of the calculated steps;
responsive to a failure or interruption prior to executing all of the calculated steps, calculating an updated, set of steps to achieve the desired end-state from an updated current state; and
executing the updated calculated steps.

10. The method of claim 9 wherein the updated set of steps is shorter.

11. The method of claim 1 wherein determining differences between the current version of the database and the changed version of first branch further comprises:
identifying changes the user associated with the first branch made to the copy of the schema of the main database.

12. The method of claim 1 wherein creating a branch further comprises:
creating a copy of the main database in the specific state by creating a copy of the schema of the main database, and copying data from the main database into the copy of the main database.

13. The method of claim 12 wherein copying data from the main database into the copy of the main database further comprises:
copying a subset of the data stored in the main database.

14. The method of claim 12 wherein copying data from the main database into the copy of the main database further comprises:
copying a filtered subset of the data stored in the main database, further comprising filtering the data stored in the main database according to at least one criterion from a group of criteria consisting of: data sensitivity, data content, storage location and sharding architecture.

15. The method of claim 12 wherein copying data from the main database into the copy of the main database further comprises:
copying all of the data stored in the main database.

16. The method of claim 1 wherein creating a branch further comprises:
creating a copy of the main database in the specific state by creating a copy of the schema of the main database, and populating the copy of the main database with programmatically created data or with a stored data set.

17. The method of claim 12 wherein merging a branch further comprises:
restoring changed branch data back into the main database.

18. The method of claim 12 wherein creating a branch further comprises:
creating a copy of at least one object-relational mapping system migration control table of the main database.

19. The method of claim 18 wherein merging a branch further comprises:
merging at least one change to the copy of the at least one object-relational mapping system migration control table into the at least one object-relational mapping system migration control table of the main database.

20. At least one non-transitory computer-readable storage medium for maintaining version control for databases in a database version tracking system, with branching support for database schemas, the at least one non-transitory computer-readable storage medium storing computer executable instructions that, when loaded into computer memory and executed by at least one processor of a computing device, cause the computing device to perform the following steps:
creating a first branch of a main database from the database version tracking system;
wherein the first branch further comprises a copy of the main database in a specific state, as recorded in the database version tracking system, the copy being created in a workspace isolated from the database version tracking system, the copy comprising at least a copy of a schema of the main database in a specific state;
responsive to receiving a control signal from a user associated with the first branch indicating to merge a changed version of the first branch back into the database version tracking system, determining differences between a current version of the main database as tracked by the database version tracking system and the changed version of the first branch;
wherein determining differences between the current version of the database and the changed version of the first branch further comprises generating at least one schema diff;
determining, from the at least one schema diff, whether merging the changed version of the first branch back into the database version tracking system creates a conflict;
responsive to determining that merging the changed version of the first branch back into the database version tracking system does not create a conflict, merging the changed version of the first branch back into the database version tracking system;
wherein merging the changed version of the first branch back into the database version tracking system further comprises performing at least one schema operation from a group of schema operations consisting of: create table, drop table and alter table, the at least one schema operation being indicated by the at least one schema diff;
creating a second branch of the main database from the database version tracking system;
wherein the second branch further comprises a copy of the main database separate from the copy comprising the first branch, the separate copy being created in a workspace isolated from the database version tracking system, the copy comprising at least a copy of the schema of the main database in the specific state;
responsive to receiving a control signal from a user associated with the second branch indicating to merge a changed version of the second branch back into the database version tracking system, determining differences between the changed version of the first branch and the changed version of the second branch, relative to a version of the main database as tracked by the database version tracking system from which the first branch and the second branch were generated;
wherein determining differences further comprises generating at least one schema diff;
determining, from the at least one schema diff, whether merging the changed version of the second branch back into the database version tracking system on top of the changed first version of the first branch creates a conflict; and
responsive to results of the determining, performing a step from a group of steps consisting of:
responsive to determining that merging the changed version of the second branch back into the database version tracking system on top of the changed version of the first branch does not create a conflict, merging the changed version of the second branch back into the database version tracking system on top of the changed version of the first branch, the merging further comprising performing at least one schema operation from a group of schema operations consisting of: create table, drop table and alter table; and
responsive to determining that merging the changed version of the second branch back into the database version tracking system on top of the changed version of the first branch does create a conflict, not merging the changed version of the second branch back into the database version tracking system on top of the changed version of the first branch.

21. The at least one non-transitory computer-readable storage medium of claim 20, wherein merging the changed version of the second branch back into the database version tracking system on top of the changed version of the first branch further comprises:
performing a three-way merge of the changed version of the first branch, the changed version of the second branch, and the version of the main database as tracked by the database version tracking system from which the first branch and the second branch were generated, utilizing the at least one schema diff.

22. A computer system for maintaining version control for databases in a database version tracking system, with branching support for database schemas, the computer system comprising:
at least one processor;
computer memory;
program code for creating a first branch of a main database from the database version tracking system;
wherein the first branch further comprises a copy of the main database in a specific state, as recorded in the database version tracking system, the copy being created in a workspace isolated from the database version tracking system, the copy comprising at least a copy of a schema of the main database in a specific state;
program code for, responsive to receiving a control signal from a user associated with the first branch indicating to merge a changed version of the first branch back into the database version tracking system, determining differences between a current version of the main database as tracked by the database version tracking system and the changed version of the first branch;
wherein determining differences between the current version of the database and the changed version of the first branch further comprises generating at least one schema diff;
program code for determining, from the at least one schema diff, whether merging the changed version of the first branch back into the database version tracking system creates a conflict;
program code for, responsive to determining that merging the changed version of the first branch back into the database version tracking system does not create a conflict, merging the changed version of the first branch back into the database version tracking system;
wherein merging the changed version of the first branch back into the database version tracking system further comprises performing at least one schema operation from a group of schema operations consisting of: create table, drop table and alter table, the at least one schema operation being indicated by the at least one schema diff;
program code for creating a second branch of the main database from the database version tracking system;
wherein the second branch further comprises a copy of the main database separate from the copy comprising the first branch, the separate copy being created in a workspace isolated from the database version tracking system, the copy comprising at least a copy of the schema of the main database in the specific state;
program code for, responsive to receiving a control signal from a user associated with the second branch indicating to merge a changed version of the second branch back into the database version tracking system, determining differences between the changed version of the first branch and the changed version of the second branch, relative to a version of the main database as tracked by the database version tracking system from which the first branch and the second branch were generated;
wherein determining differences further comprises generating at least one schema diff;
program code for determining, from the at least one schema diff, whether merging the changed version of the second branch back into the database version tracking system on top of the changed first version of the first branch creates a conflict; and
program code for, responsive to results of the determining, performing a step from a group of steps consisting of:
responsive to determining that merging the changed version of the second branch back into the database version tracking system on top of the changed version of the first branch does not create a conflict, merging the changed version of the second branch back into the database version tracking system on top of the changed version of the first branch, the merging further comprising performing at least one schema operation from a group of schema operations consisting of: create table, drop table and alter table; and
responsive to determining that merging the changed version of the second branch back into the database version tracking system on top of the changed version of the first branch does create a conflict, not merging the changed version of the second branch back into the database version tracking system on top of the changed version of the first branch.

23. The computer system of claim 22, wherein the program code for merging the changed version of the second branch back into the database version tracking system on top of the changed version of the first branch further comprises:
program code for performing a three-way merge of the changed version of the first branch, the changed version of the second branch, and the version of the main database as tracked by the database version tracking system from which the first branch and the second branch were generated, utilizing the at least one schema diff.

24. The computer system of claim 22 further comprising:
program code for maintaining a queue of pending changes that are in the process of being merged back into the main database as tracked by the database version tracking system.

* * * * *